(12) United States Patent
Jain et al.

(10) Patent No.: US 8,898,612 B1
(45) Date of Patent: Nov. 25, 2014

(54) SYSTEM FOR PLACING DUMMY TILES IN METAL LAYERS OF INTEGRATED CIRCUIT DESIGN

(71) Applicants: Ankit Jain, Modinagar (IN); Narayanan Kannan, Delhi (IN)

(72) Inventors: Ankit Jain, Modinagar (IN); Narayanan Kannan, Delhi (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/066,696

(22) Filed: Oct. 30, 2013

(51) Int. Cl.
G06F 17/50 (2006.01)

(52) U.S. Cl.
CPC .................. *G06F 17/5072* (2013.01)
USPC ............................. 716/122; 716/118; 716/119

(58) Field of Classification Search
CPC ............ G06F 17/5068; G06F 17/5072; G06F 17/5077; G06F 17/5081; G06F 17/5045; G06F 17/505; H01L 23/5286
USPC .......................................... 716/118, 119, 122
See application file for complete search history.

(56) References Cited

U.S. PATENT DOCUMENTS

| | | | |
|---|---|---|---|
| 6,732,340 B1 * | 5/2004 | Akashi | 716/113 |
| 7,665,055 B2 | 2/2010 | Kobayashi | |
| 7,913,221 B2 * | 3/2011 | Miyashita et al. | 716/139 |
| 2006/0166434 A1 * | 7/2006 | Kinoshita et al. | 438/253 |
| 2013/0227502 A1 * | 8/2013 | Fang et al. | 716/102 |

* cited by examiner

*Primary Examiner* — Vuthe Siek
(74) *Attorney, Agent, or Firm* — Charles Bergere

(57) ABSTRACT

An electronic design automation (EDA) tool for inserting dummy tiles between interconnect lines of an integrated circuit design includes a memory for storing the integrated circuit design and a processor in communication with the memory. The processor identifies those interconnect lines that are at different voltage levels, have a length greater than a predefined threshold length and a spacing less than a predefined threshold spacing, and inserts blockage areas between such interconnect lines. The processor skips the blockage areas and adds dummy tiles only between those interconnect lines that do not meet predetermined criteria.

14 Claims, 5 Drawing Sheets

SYSTEM FOR PLACING DUMMY TILES IN METAL LAYERS OF INTEGRATED CIRCUIT DESIGN

BACKGROUND OF THE INVENTION

The present invention relates to integrated circuit design tools, and more particularly, to a system for placing dummy tiles in the metal layers of an integrated circuit design.

The semiconductor industry has witnessed a rapid and consistent miniaturization of electronic devices with the introduction of deep submicron (DSM, L≤0.35 microns) and ultra-deep submicron (UDSM, L≤0.1 microns) technologies. Reduction of device sizes has led to an increase in device density with thousands of complementary metal-oxide semiconductor (CMOS) transistors being integrated on a single die. Miniaturization has also introduced several design challenges, especially for semiconductor devices that include multi-layered interconnect lines. The density of interconnect lines varies across different layers of a design. Such a varying pattern often leads to breaking of interconnect lines during fabrication, such as during chemical-mechanical polishing (CMP), which reduces manufacturing yield. It is possible to address some of these process-related issues during the circuit design stage of the semiconductor device.

A known technique to unify the pattern density of the interconnect lines is by placing dummy tiles in proximity to the interconnect lines that do not meet certain predefined density requirements (known as tiling process). The tiling process is carried out during the design stage using commercially available electronic design automation (EDA) tools such as GTsmooth provided by Xyalis, Inc. of Grenoble, France.

FIG. 1 shows a schematic layout diagram of a metal layer of a conventional integrated circuit design 102. The integrated circuit design 102 includes a plurality of interconnect lines 104. An EDA tool identifies those areas of the design 102 where the interconnect pattern density does not meet predefined density requirements and inserts dummy tiles 106 in those areas. Inserting dummy tiles 106 makes the pattern density more uniform, which improves the efficiency of the CMP process and leads to higher manufacturing yield.

Though the predefined density requirements help in achieving a uniform pattern density, they introduce a new set of design challenges. Inserting dummy tiles increases coupling or parasitic capacitance between the interconnect lines, which degrades signal integrity and increases signal transmission delay. The impact of parasitic capacitance is compounded if the interconnect lines are at different voltage levels. Tiling algorithms used by existing EDA tools do not account for the impact of voltage difference during the tiling process. Moreover, today's semiconductor devices often include multiple power domains. Interconnect lines that connect different voltage domains often have a long parallel run length and experience different noise effects, which have to be addressed during the design stage. For example, routing patterns along input/output (I/O) pads of a semiconductor device involves long parallel lengths of interconnect lines that operate at both core and pad voltage levels, and the addition of dummy tiles between such interconnect lines adversely impacts the noise effects, which further leads to design complexities in characterizing the noise.

Therefore, it would be advantageous to have a system and method for placing dummy tiles in an integrated circuit design that reduces the impact of parasitic capacitance on interconnect lines operating at different voltage levels, reduces signal transmission delays and enhances signal integrity of the integrated circuit design, and overcomes the above-mentioned limitations of existing systems for placing dummy tiles in an integrated circuit design.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF PREFERRED EMBODIMENTS

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an electronic design automation (EDA) tool for inserting dummy tiles in a metal layer of an integrated circuit (IC) design is provided. The metal layer includes a plurality of interconnect lines. The EDA tool includes a memory that stores the IC design and includes a routing database. The routing database includes routing information of the plurality of interconnect lines. The EDA tool further includes a processor in communication with the memory. The processor includes means for identifying a first set of interconnect lines of the plurality of interconnect lines that are at different voltage levels, using the routing information; means for defining a blockage between first and second interconnect lines of the first set of interconnect lines based on a predefined criteria; and means for inserting the dummy tiles between the plurality of interconnect lines excluding the first and second interconnect lines.

In various embodiments of the present invention, the predefined criteria includes a length of the first and second interconnect lines being greater than a first predefined threshold. In another embodiment of the present invention, the predefined criteria includes a spacing between the first and second interconnect lines being less than a second predefined threshold.

Various embodiments of the present invention provide an electronic design automation (EDA) tool for inserting dummy tiles between interconnect lines of a integrated circuit design. The EDA tool identifies those interconnect lines that are at different voltage levels, that have a length which is greater than a first predefined threshold and a spacing which is less than a second predefined threshold, and defines blockage areas between such interconnect lines. Dummy tiles are not inserted in the blockage areas which significantly reduces the impact of parasitic capacitance between the interconnect lines, reduces signal transmission delay and improves signal integrity. The process ensures that interconnect lines that have large parallel lengths are skipped from the tiling process which helps in reducing design complexities in characterizing noise effects on such interconnect lines. The EDA tool adds dummy tiles between interconnect lines for which blockage area is not defined, thus unifying the pattern density, which improves the efficiency of the chemical-mechanical polishing (CMP) process and leads to higher manufacturing yield.

Figure 1:
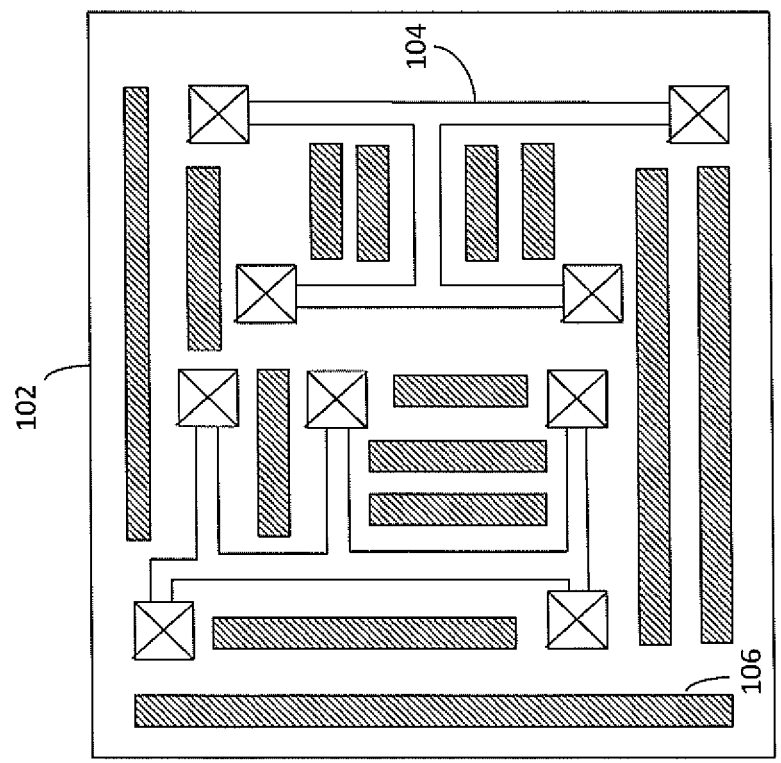
FIG. 1 is a schematic layout diagram of a metal layer of a conventional integrated circuit design.
Figure 2:
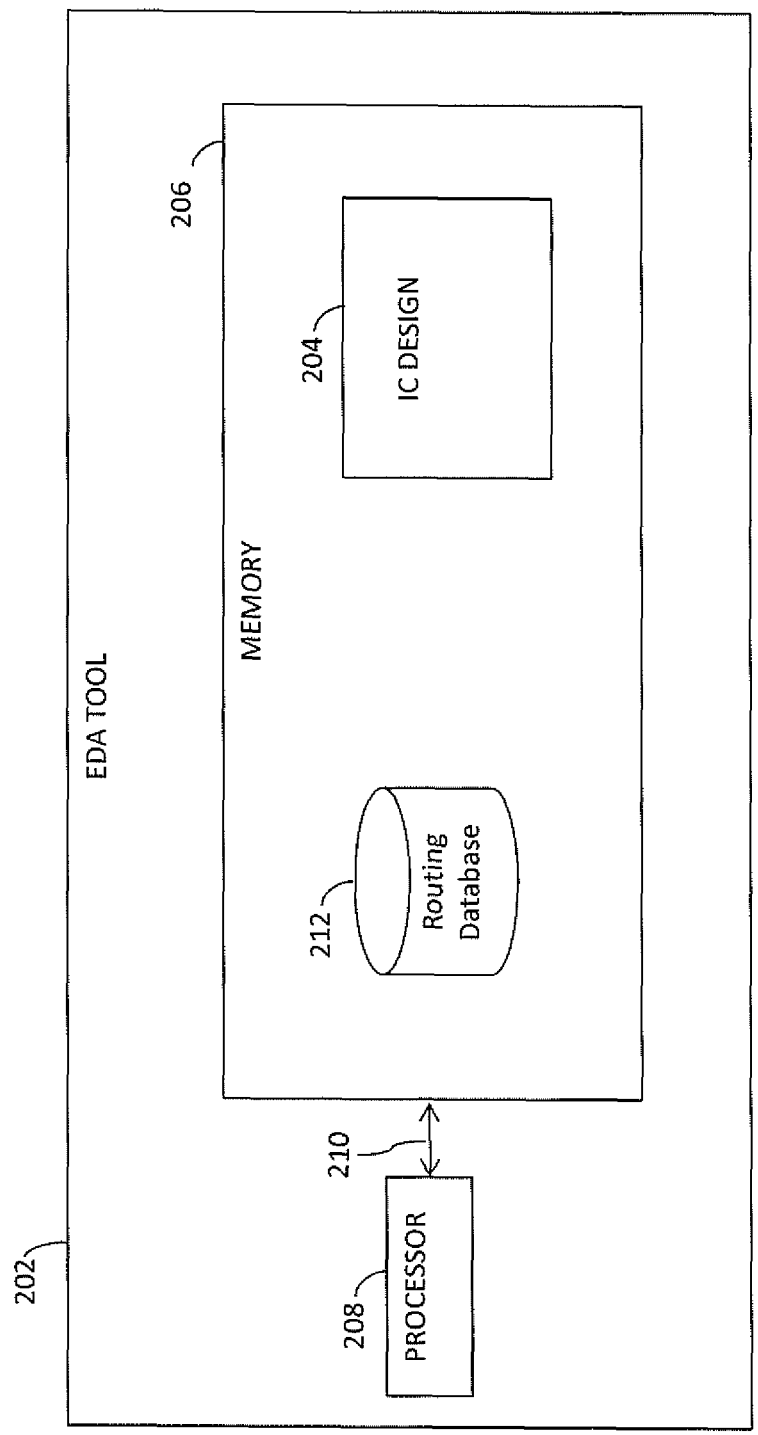
FIG. 2 is a schematic block diagram of an electronic design automation (EDA) tool for placing dummy tiles in an integrated circuit design in accordance with an embodiment of the present invention.

Referring now to FIG. 2, a schematic block diagram of an electronic design automation (EDA) tool 202 for placing dummy tiles in a integrated circuit design 204 in accordance with an embodiment of the present invention is shown. The EDA tool 202 includes a memory 206 and a processor 208 in communication with the memory 206, such as with a bus 210. The memory 206 stores the IC design 204 and includes a routing database 212. Examples of the IC design 204 include circuits such as a microprocessor, microcontroller unit (MCU), system-on-chip (SOC), and application specific integrated circuit (ASIC) designs.

The processor 208 and the memory 206 comprise a computer system that can range from a stand-alone personal computer to a network of processors and memories, to a mainframe system. The computer system must be able to run design automation tools for simulating semiconductor layout designs for digital and analog circuits, such as those provided by Xyalis, Inc., of Grenoble France and Cadence Design Systems, Inc. of San Jose, Calif. Such tools and computer systems are known to those of skill in the art. As is known by those of skill in the art, a computer system operates in accordance with the software executing on the processor. When the processor performs functions, at that instant in time when the processor is performing a particular function, then the processor acts as a means for performing the function. Accordingly, when the phrase "means for" is used it refers to the processor being in a state to perform the "for" operation described. Any elements described or claimed as "means for" are therefore shown in the drawings as the processor in communication with the memory.

Figure 3B:
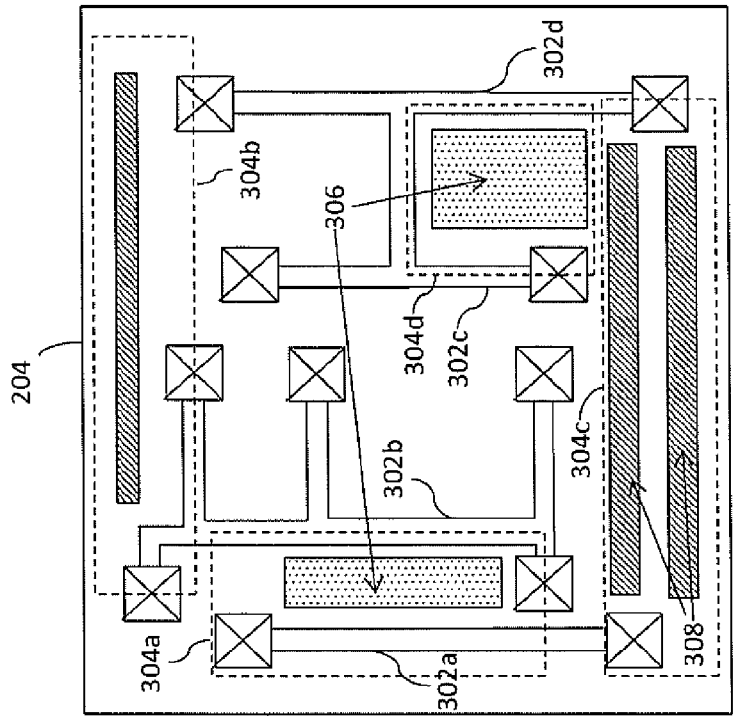
FIGS. 3A and 3B are schematic layout diagrams of an integrated circuit design, before and after placing dummy tiles, in accordance with an embodiment of the present invention.
Figure 3A:
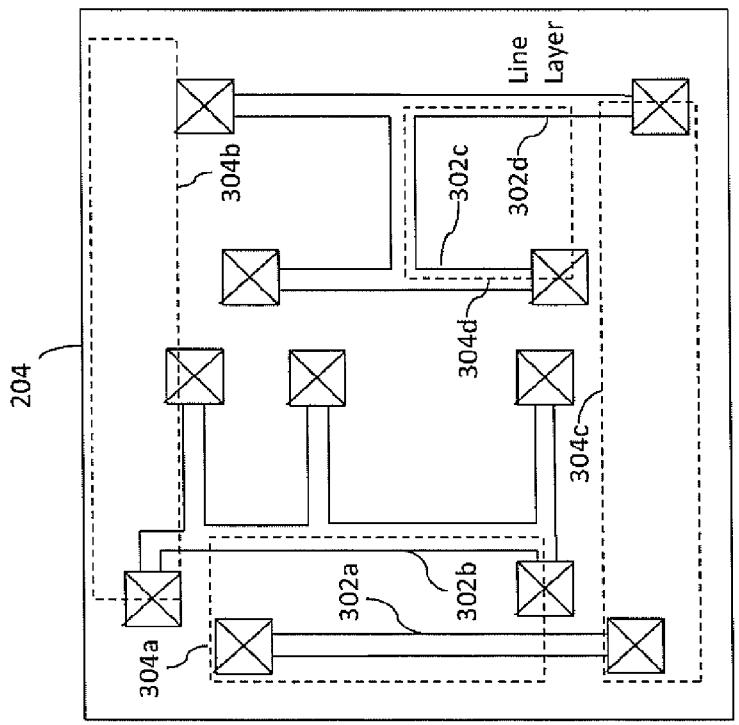

FIG. 3A shows an exemplary schematic layout diagram of a metal layer of a integrated circuit design 204. The integrated circuit design 204 includes a plurality of interconnect lines 302 including first thorough fourth interconnect lines 302a-302d. The routing database 212 stores information related to routing of the interconnect lines 302 in the metal layer. In various embodiments of the present invention, the routing information includes interconnect routing design and layout patterns, pattern density requirements of the interconnect lines 302 across various sections of the metal layer (defined by foundry specifications), length and thickness of each interconnect line 302, spacing between parallel interconnect lines 302, capacitance of parallel interconnect lines 302, voltage level of each interconnect line 302, and first second predefined thresholds corresponding to length of the interconnect lines 302 and spacing between the interconnect lines 302, respectively.

During the tiling process, the processor 208 scans the layout of the integrated circuit design 204 to identify sections of the metal layer that do not meet predefined density requirements. The processor 208 compares the pattern density of each section with a predefined density criteria. The predefined density criteria are foundry specified and are required to be met to prevent damages to the integrated circuit design 204 during chemical-mechanical polishing (CMP) processes. In an example, the processor 208 identifies a plurality of sections 304 of the integrated circuit design 204 that do not meet the predefined density criteria.

Thereafter, the processor 208 selects a section 304 that has two parallel interconnect lines 302 and checks voltage levels of the two parallel interconnect lines 302. If the voltage levels are same, the processor 208 inserting dummy tiles between the two interconnect lines 302. However if the voltage levels are different, the processor 208 checks if the length of the two interconnect lines 302 is greater than the first predefined threshold. If the length is less than the first predefined threshold, the processor 208 inserts dummy tiles between the two interconnect lines 302. If the length is greater that the first predefined threshold, the processor 208 further checks if a spacing between the two interconnect lines 302 is less than the second predefined threshold. If the spacing is greater than the second predefined threshold, the processor 208 inserts dummy tiles between the two interconnect lines 302. If the spacing is less than the second predefined threshold, the processor 208 defines a blockage area 306 between the two interconnect lines 302 and repeats the same process over other sections 304 and adds blockage areas 306 between the interconnect lines 302 that do not meet above-mentioned criteria, as shown in FIG. 3B. Upon defining the blockage areas 306, the processor 208 inserts dummy tiles 308 between interconnect lines 302 that do not have blockage areas 306 defined therebetween (shown in FIG. 3B). Upon inserting the dummy tiles 308, the processor 208 removes the blockage areas 306 and again checks the pattern density of the sections 304. If the predefined density criteria is met, the processor 208 halts the tiling process else the process is repeated until the predefined density criteria is met.

In various embodiments of the present invention, the processor 208 may change the values of the first and second predefined thresholds after the first run and perform the subsequent iterations using the newly defined first and second predefined thresholds. In one embodiment of the present invention, the processor 208 may halt the tiling process after adding the dummy tiles 308, without performing any iteration. In another embodiment of the present invention, the processor 208 may stop the comparison process after adding the dummy tiles 308 in the first run. If the predefined density criteria are not met, the processor 208 may continue adding the dummy tiles 308 till the predefined density criteria is met.

In an example, the processor 208 selects the section 304a (having first and second interconnect lines 302a and 302b) and identifies that the interconnect lines 302a and 302b are at different voltage levels, have a length greater than the first threshold and a spacing therebetween less than the second threshold. Hence, the processor 208 defines a blockage area 306 between the interconnect lines 302a and 302b. The processor 208 repeats the same process over the remaining sections 304b-304d of which the sections 304b and 304c do not meet the above-mentioned criteria and are selected for tiling. A blockage area 306 is defined between the interconnect lines 302c and 302d of the section 304d, as shown in FIG. 3B. Thereafter, the processor 208 adds dummy tiles 308 between the interconnect lines 302 of the sections 304b and 304c and skips the sections 304a and 304d, as shown in FIG. 3B. When the predefined density criteria are met, the processor 208 halts the tiling process.

Figure 4A:
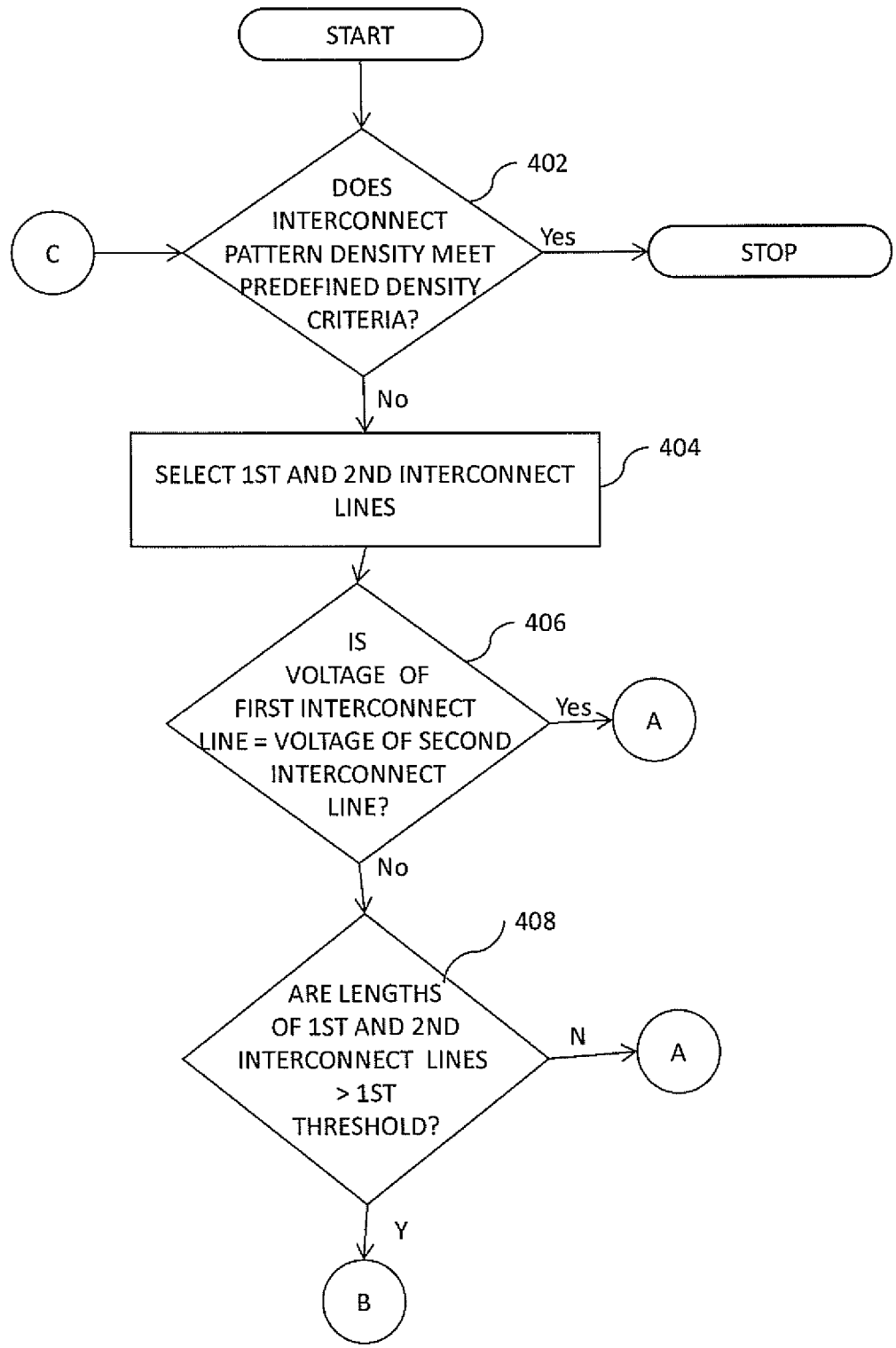
FIGS. 4A and 4B are a flow chart illustrating a method of placing dummy tiles in an integrated circuit design in accordance with an embodiment of the present invention.
Figure 4B:
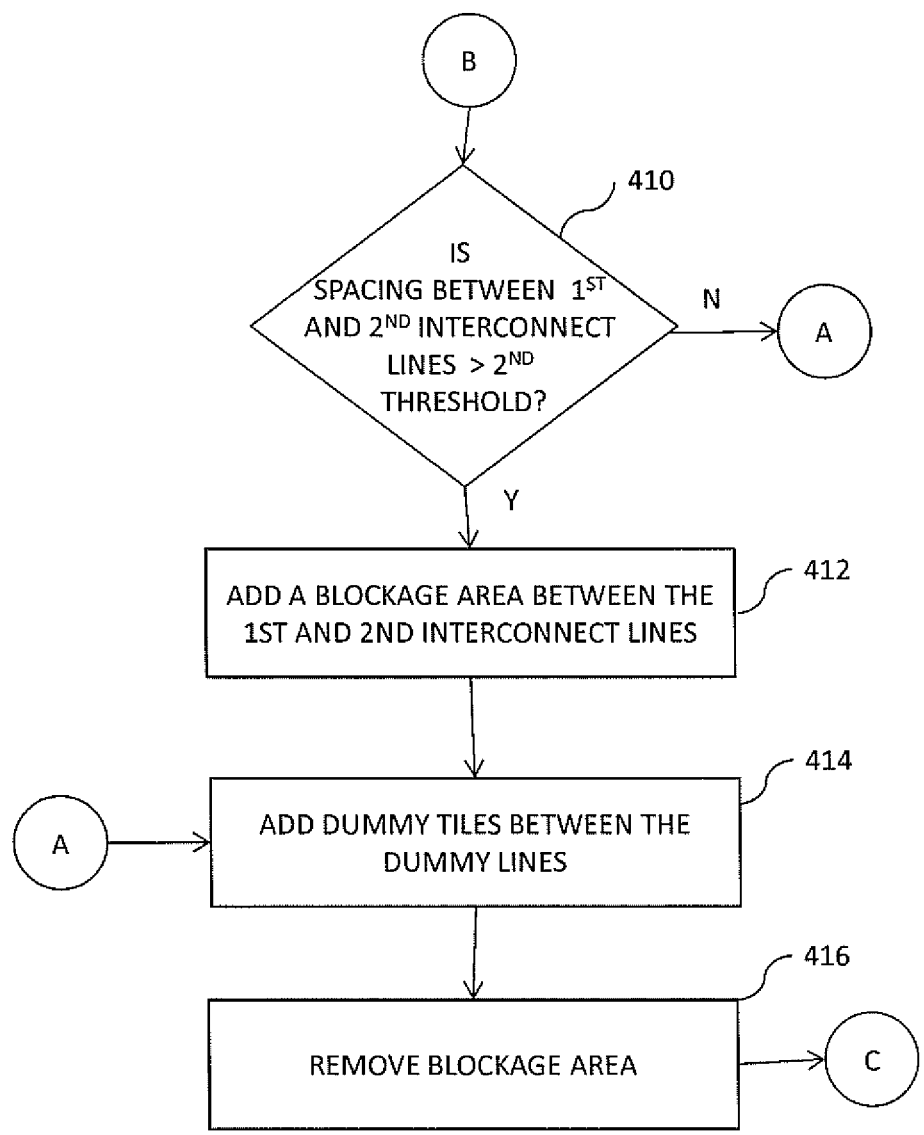

Referring now to FIGS. 4A and 4B a flow chart illustrating a method of placing dummy tiles 308 in the integrated circuit design 204, in accordance with an embodiment of the present invention. At step 402, the processor 208 checks or scans the integrated circuit design 204 to identify sections 304 of the metal layer of the integrated circuit design 204 that do not meet foundry-specified, predefined density criteria. The processor 208 compares the pattern density of each section with the predefined density criteria. If the predefined density criteria are met, the process stops as no tiling is required. If the predefined density criteria is not met, the processor 208 identifies the sections 304 that require tiling and proceeds to performing step 404.

At step 404, the processor 208 selects a section 304, which has two parallel interconnect lines 302. At step 406, the processor 208 checks voltage levels of the two interconnect lines 302. If the voltage levels are same, step 414 is performed at which the processor 208 inserts the dummy tiles 308 between the two interconnect lines 302. However if the voltage levels are different, step 408 is performed at which the processor 208 checks if a length of the two interconnect lines 302 is greater than the first predefined threshold. If the length is less than the first predefined threshold, step 414 is performed at which the processor 208 inserts the dummy tiles 308 between the two interconnect lines 302. If the length is greater that the first predefined threshold, step 410 is performed at which the processor 208 further checks if a spacing between the two interconnect lines 302 is less than the second predefined threshold. If the spacing is greater than the second predefined threshold, step 414 is performed at which the processor 208 inserts the dummy tiles 308 between the two interconnect lines 302. If the spacing is less than the second predefined threshold, step 412 is performed at which the processor 208 defines a blockage area 306 between the two interconnect lines 302. Upon scanning all the sections 304, the processor 208 inserts the dummy tiles 308 between the interconnect lines 302 that do not have blockage areas 306 defined therebetween, at step 414. Upon inserting the dummy tiles 308, the processor 208 removes the blockage areas 306 at step 416 and proceeds to step 402 and again checks the pattern density of the sections 304. If the predefined density criteria is met, the processor 208 halts the tiling process else the process is repeated until the predefined density criteria is met. In one embodiment of the present invention, the processor 208 may halt the tiling process after adding the dummy tiles 308, without performing any iteration. In another embodiment of the present invention, the processor 208 may stop the comparison process after adding the dummy tiles 308 in the first run. If the predefined density criteria are not met, the processor 208 may continue adding the dummy tiles 308 till the predefined density criteria is met.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. It should be understood that, although the terms first, second, etc. and horizontal and vertical are used to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for inserting dummy tiles in a metal layer of an integrated circuit design, wherein the metal layer includes a plurality of interconnect lines, the EDA tool comprising:
a memory that stores the integrated circuit design and includes a routing database including routing information of the plurality of interconnect lines; and
a processor in communication with the memory, wherein the processor includes:
means for identifying a first set of interconnect lines of the plurality of interconnect lines that are at different voltage levels, using the routing information;
means for defining a blockage between first and second interconnect lines of the first set of interconnect lines, based on at least a length of the first and second interconnect lines being greater than a first predefined threshold and a spacing between the first and second interconnect lines being less than a second predefined threshold;
means for inserting the dummy tiles between the plurality of interconnect lines excluding the first and second interconnect lines;
means for removing the blockage between the first and second interconnect lines after the insertion of the dummy tiles is complete; and
means for checking a density of the plurality of interconnect lines after the insertion of the dummy lines is complete.

2. The EDA tool of claim 1, wherein a blockage is defined when a length of each of the first and second interconnect lines is greater than a first predefined threshold.

3. The EDA tool of claim 1, wherein a blockage is defined when a spacing between the first and second interconnect lines is less than a second predefined threshold.

4. The EDA tool of claim 1, wherein the density of the plurality of interconnect lines is less than a predefined density criteria.

5. The EDA tool of claim 4, wherein the routing information includes at least one of interconnect routing design and layout patterns of the integrated circuit design, the predefined density criteria, a length and thickness of each interconnect line, a spacing and capacitance between the plurality of interconnect lines, a voltage level of each interconnect line, and first second predefined thresholds.

6. An electronic design automation (EDA) tool for inserting dummy tiles in a metal layer of an integrated circuit design, wherein the metal layer includes a plurality of interconnect lines, the EDA tool comprising:
a memory that stores the integrated circuit design and includes a routing database, wherein the routing database includes routing information of the plurality of interconnect lines; and
a processor in communication with the memory, wherein the processor:

identifies a first set of interconnect lines of the plurality of interconnect lines based on the routing information, wherein the first set of interconnect lines are at different voltage levels;

defines a blockage between first and second interconnect lines of the first set of interconnect lines, based on at least a length of the first and second interconnect lines being greater than a first predefined threshold and a spacing between the first and second interconnect lines being less than a second predefined threshold;

inserts the dummy tiles between the plurality of interconnect lines by excluding the first and second interconnect lines;

removes the blockage between the first and second interconnect lines after the insertion of the dummy tiles is complete; and checks a density of the plurality of interconnect lines after the insertion of the dummy lines is complete.

7. The EDA tool of claim 6, wherein the density of the plurality of interconnect lines is less than a predefined density criteria.

8. The EDA tool of claim 7, wherein the routing information includes at least one of interconnect routing design and layout patterns of the integrated circuit design, the predefined density criteria, a length and thickness of each interconnect line, a spacing and capacitance between the plurality of interconnect lines, a voltage level of each interconnect line, and first second predefined thresholds.

9. The EDA tool of claim 6, wherein the processor further modifies the first and second predefined thresholds.

10. A method for inserting dummy tiles in a metal layer of an integrated circuit design using an electronic design automation (EDA) tool, wherein the metal layer includes a plurality of interconnect lines, and wherein the EDA tool includes a processor and a memory in communication with the processor and wherein the memory stores the integrated circuit design and includes a routing database, and wherein the routing database includes routing information of the plurality of interconnect lines, the method comprising:

identifying a first set of interconnect lines of the plurality of interconnect lines based on the routing information, wherein the first set of interconnect lines are at different voltage levels;

defining a blockage between first and second interconnect lines of the first set of interconnect lines based on at least a length of the first and second interconnect lines being greater than a first predefined threshold and a spacing between the first and second interconnect lines being less than a second predefined threshold;

inserting the dummy tiles between the plurality of interconnect lines by excluding the blockage areas between the first and second interconnect lines;

removing the blockage between the first and second interconnect lines, after the insertion of the dummy tiles is complete, using the processor; and checking a density of the plurality of interconnect lines after the insertion of the dummy lines is complete using the processor.

11. The method of claim 10, wherein the blockage is defined when a length of each of the first and second interconnect lines is greater than a first predefined threshold.

12. The method of claim 10, wherein the blockage is defined when a spacing between the first and second interconnect lines is less than a second predefined threshold.

13. The method of claim 10, wherein the density of the plurality of interconnect lines is less than a predefined density criteria.

14. The method of claim 13, wherein the routing information includes at least one of interconnect routing design and layout patterns of the integrated circuit design, the predefined density criteria, a length and thickness of each interconnect line, a spacing and capacitance between the plurality of interconnect lines, a voltage level of each interconnect line, and first second predefined thresholds.

* * * * *